US012659560B2

(12) United States Patent
Ren et al.

(10) Patent No.: US 12,659,560 B2
(45) Date of Patent: Jun. 16, 2026

(54) IMAGE SENSOR DRIVING DEVICE

(71) Applicant: **AAC Microtech (Changzhou) Co.,
Ltd.**, Changzhou City (CN)

(72) Inventors: Zhang Ren, Changzhou (CN); **Wei
Song, Changzhou (CN); Yun Tang**,
Changzhou (CN)

(73) Assignee: **AAC Microtech (Changzhou) Co.,
Ltd.**, Changzhou City (CN)

( * ) Notice: Subject to any disclaimer, the term of this
patent is extended or adjusted under 35
U.S.C. 154(b) by 49 days.

(21) Appl. No.: 18/988,943

(22) Filed: Dec. 20, 2024

(65) Prior Publication Data

US 2025/0373919 A1 Dec. 4, 2025

Related U.S. Application Data

(63) Continuation of application No.
PCT/CN2024/096702, filed on May 31, 2024.

(51) Int. Cl.
*H04N 23/54* (2023.01)
*H04N 23/51* (2023.01)
(52) U.S. Cl.
CPC ............. *H04N 23/54* (2023.01); *H04N 23/51*
(2023.01)

(58) Field of Classification Search
CPC .............................. H04N 23/54; H04N 23/51
USPC ......................................................... 348/374
See application file for complete search history.

(56) References Cited

U.S. PATENT DOCUMENTS

2020/0120242 A1* 4/2020 Wade ....................... G02B 7/02
2022/0094853 A1* 3/2022 Xu .......................... H04N 23/54

* cited by examiner

*Primary Examiner* — Joel W Fosselman
(74) *Attorney, Agent, or Firm* — Wiersch Law Group

(57) ABSTRACT

The present application provides an image sensor driving
device including a housing, an elastic support assembly, an
image sensor assembly, a driving coil, and a magnet. The
elastic support assembly includes a first circuit plate, a
second circuit plate provided around the periphery of the
first circuit plate and is fixed and electrically connected to
the first circuit plate, and an elastic member fixed to the
housing. The second circuit plate is directly opposite and
spaced apart from the magnet, and the driving coil is formed
on the second circuit board by material additions or etching,
thereby effectively simplifying the assembly process and
cost and saving the stacking space, which is conducive to the
design of the magnetic circuit to enhance the BL value.
Besides, the weight of the driving coil is effectively reduced,
and the moving mass is about 10% lower than that of the
voice coil.

8 Claims, 6 Drawing Sheets

A—A

B—B

41

4111 ⎤
        ⎬ 411
4112 ⎦

IMAGE SENSOR DRIVING DEVICE

CROSS-REFERENCE TO RELATED APPLICATIONS

This application is a continuation of International Application No. PCT/CN2024/096702, May 31, 2024, the entire contents of which is incorporated herein by reference.

TECHNICAL FIELD

The present application relates to the technical field of driving apparatuses, in particular to an image sensor driving device.

BACKGROUND

With the development of camera technology, the image sensor driver is widely used in various camera devices. The combination of image sensor drivers with various portable electronic devices such as mobile phones, video cameras, computers, etc. is even more favored by consumers.

Currently, there are three existing physical drive methods for the lens module as follows: shrapnel type, ball type, and memory alloy type. However, the cost of the shrapnel type, ball type, or memory alloy type is relatively high, and the stacking space is high and unfavorable for the design of the magnetic circuit when the voice coil is stacked and soldered to the PCB/FPC board along an optical axis direction of the image sensor.

Therefore, it is necessary to provide a new image sensor driving device to solve the above technical problems.

SUMMARY the present application provides an image sensor driving device, aiming at solving the problem of the high cost of existing image sensor driving devices.

The image sensor driving device comprises:

a housing provided with an accommodating space and a through-hole connecting the accommodating space to the outside world;

an image sensor assembly accommodated within the accommodating space and directly opposite the through-hole;

an elastic support assembly fixed to an inner side of the housing and suspending the image sensor assembly within the accommodating space;

a driving coil fixed to the image sensor assembly; and a magnet fixed to the housing and spaced opposite the driving coil; wherein the driving coil interacts with the magnet and drives the elastic support assembly in a direction perpendicular to an optical axis of the image sensor assembly to drive the image sensor assembly in synchronization;

the image sensor assembly comprises a first circuit plate, a second circuit plate provided around a periphery of the first circuit plate and fixed and electrically connected to the first circuit plate, and an image sensor body fixed to the first circuit plate;

the second circuit board is directly opposite and spaced apart from the magnet; the driving coil is formed on the second circuit board by material additions or etching, and is electrically connected to the second circuit board; the driving coil comprises a plurality of sub-coils, and each of the sub-coils comprises a plurality of coil layers stacked together; wires of the plurality of the coil layers are connected in series with each other to form a terminal electrically connected to the wires of all the coil layers, and the terminal is electrically connected to the second circuit board.

In one embodiment, each of the coil layers comprises a copper wire layer and an insulating layer.

In one embodiment, the second circuit board comprises a plurality of sub-circuit boards spaced apart from each other, and each of the sub-circuit boards is fixed and electrically connected to the first circuit board, and each of the sub-circuit boards is formed with the sub-coil.

In one embodiment, the first circuit board is rectangular, and the sub-circuit boards comprise four and are located at four corners of the first circuit board, respectively; each of the sub-circuit boards comprises a first section, a second section extending from where the first section bends, and a third section formed by protrusion of a connection portion between the first section and the second section; the first section and the second section are parallel to adjacent sides of the first circuit board, respectively; both the first section and the second section are formed with the sub-coil, and the third section is fixed to the first circuit board.

In one embodiment, the image sensor assembly further comprises a soldering tab, wherein two adjacent sub-circuit boards form a group of circuit boards, and two of the sub-circuit boards in the same group of the circuit boards are provided with one of the soldering tabs at an end close to each other, and are both electrically connected to the soldering tabs for wiring.

In one embodiment, the image sensor driving device further comprises two anti-collision blocks provided opposite to each other, and two groups of the circuit boards are each provided with one of the anti-collision blocks at one end close to each other, and are both fixedly connected to the anti-collision block.

In one embodiment, the image sensor driving device further comprises a conductive member, wherein one end of the conductive member is electrically connected to the first circuit board, and the other end of the conductive member is used for connecting an external device.

In one embodiment, the housing comprises a bottom cover and an upper cover fixed to the bottom cover and enclosing the accommodating space together with the bottom cover; the through-hole is opened in the upper cover; the magnets comprise a first magnet fixed to the upper cover and a second magnet fixed to the bottom cover; the driving coil is sandwiched between the first magnet and the second magnet, and is spaced apart from the first magnet and the second magnet; the elastic member is fixed to the bottom cover, and the anti-collision block is fixedly connected to the top cover.

Compared to the related art, in the image sensor driving device proposed in the present application, the driving coil is fixed to the elastic support assembly by material additions or etching, thereby eliminating the need for a separate wire straightening and placing process, effectively simplifying the assembly process and cost, and saving the stacking space along the optical axis direction of the image sensor, which is conducive to the design of the magnetic circuit to enhance the BL value. Due to the design of the additive material or etching fixed in the elastic support assembly, the weight of the driving coil is effectively reduced, and the moving mass is about 10% lower than that of the voice coil.

BRIEF DESCRIPTION OF THE DRAWINGS

In order to more clearly illustrate the technical solutions in the embodiments of the present application, the accompanying drawings to be used in the description of the embodiments will be briefly introduced below. Obviously, the accompanying drawings in the following description are only some embodiments of the present application, and for the person of ordinary skill in the field, other accompanying drawings can be obtained based on these drawings without putting in creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by the person of ordinary skill in the field without making creative labor are within the scope of protection of the present application.

Figure 1:
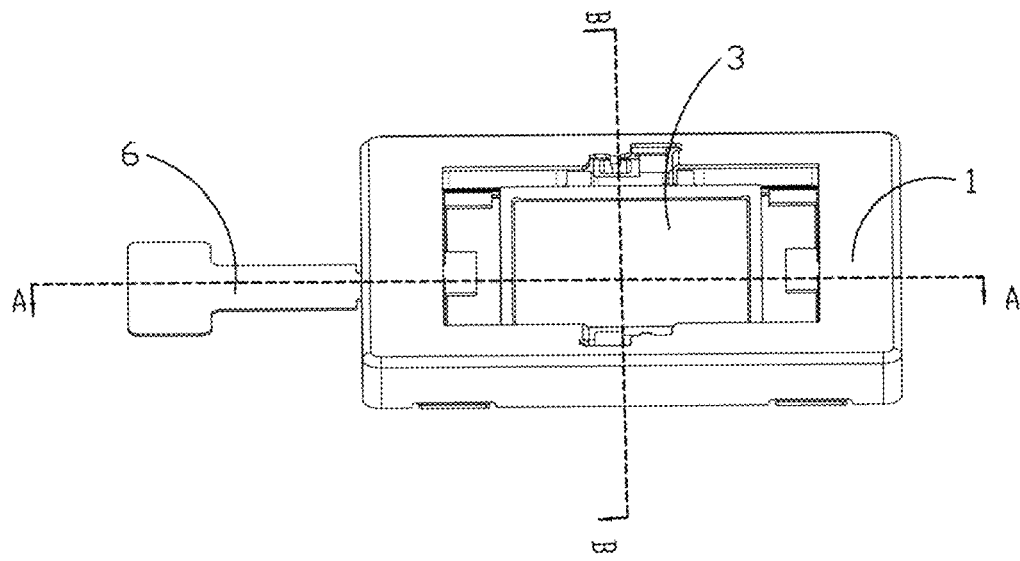
FIG. 1 shows a three-dimensional structural schematic diagram of an image sensor driving device according to an embodiment of the present application.
Figure 2:
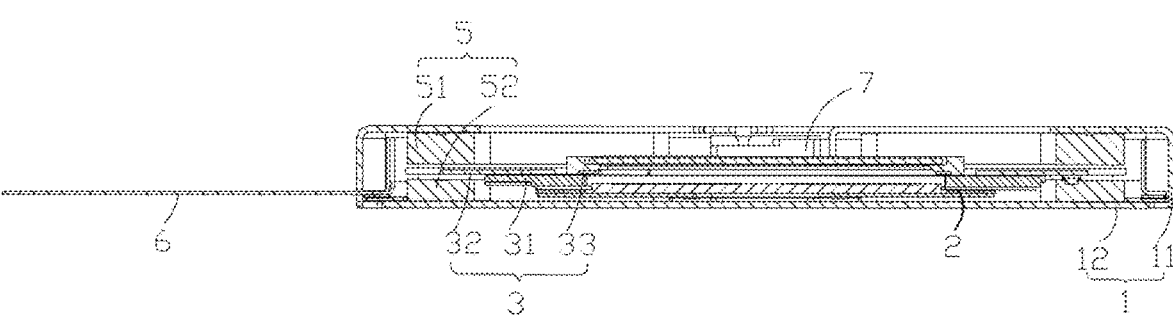
FIG. 2 shows a sectional view along the line A-A in FIG. 1.
Figure 3:
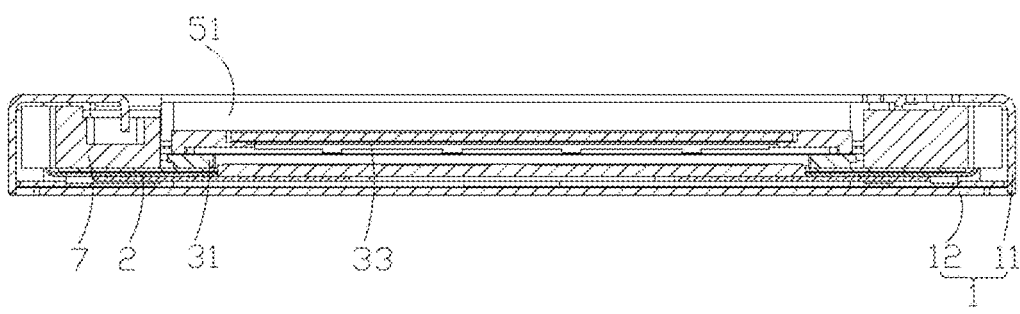
FIG. 3 shows a sectional view along the line B-B in FIG. 1.
Figure 4:
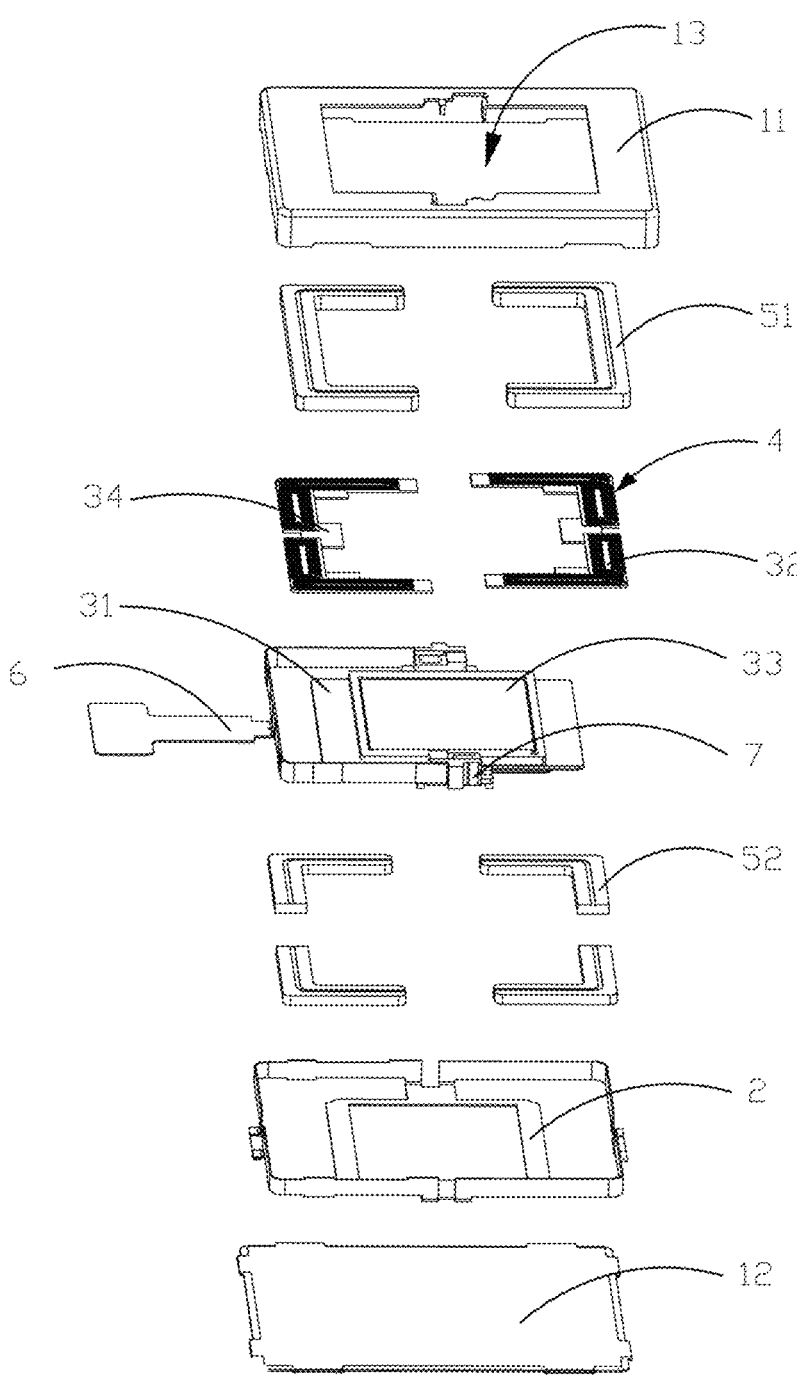
FIG. 4 shows an exploded view of a three-dimensional structure of the image sensor driving device according to an embodiment of the present application.
Figure 5:
FIG. 5 shows a structural schematic diagram of a sub-circuit board according to an embodiment of the present application.
Figure 5:
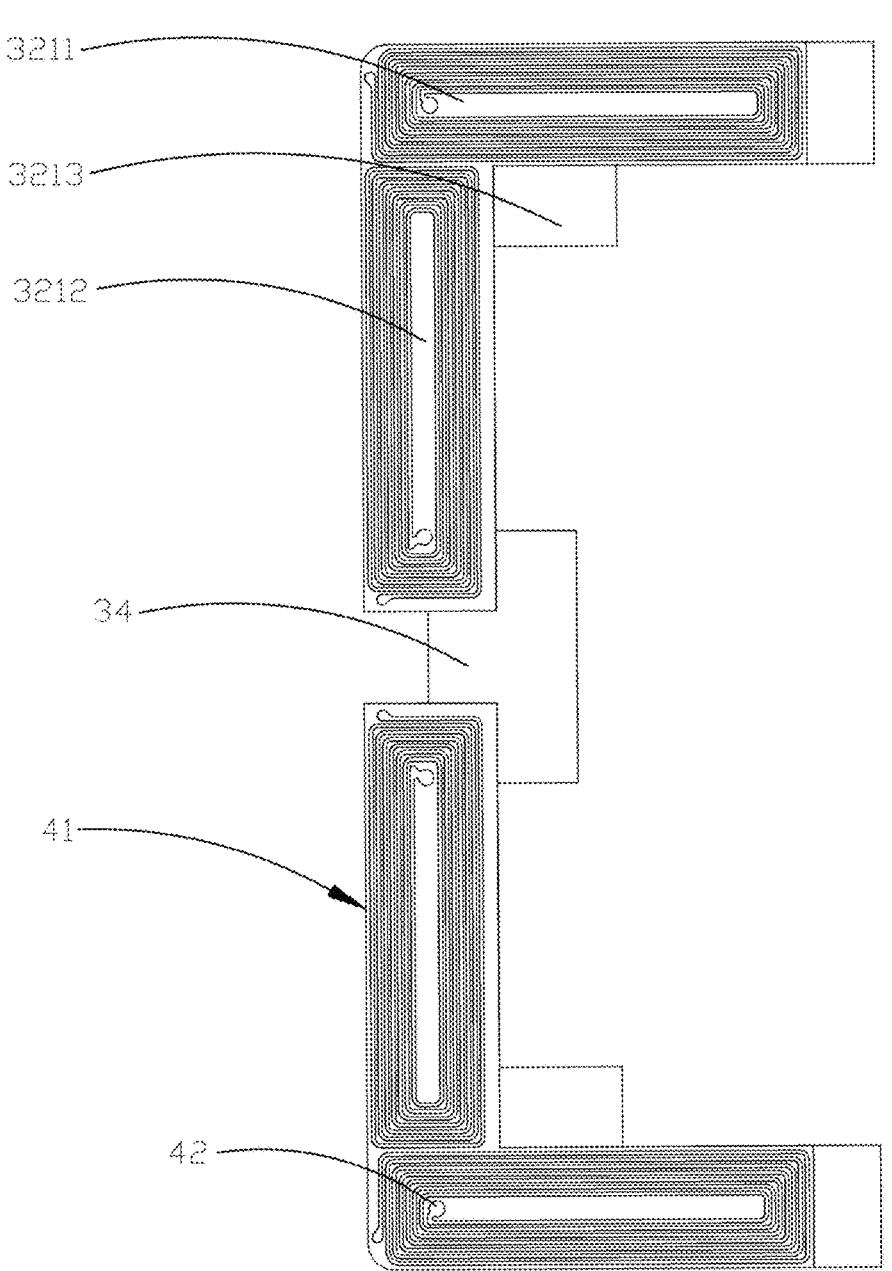
Figure 6:
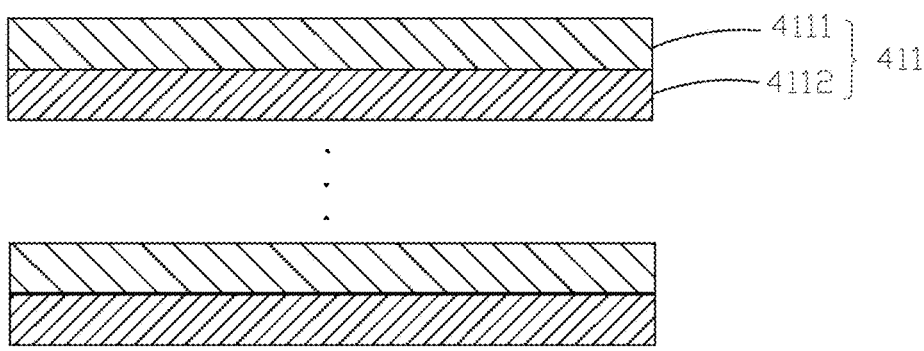
FIG. 6 shows a structural schematic diagram of a multi-layer coil layer of the sub-coil according to an embodiment of the present application.

Combined with FIGS. 1 to 6, an embodiment of the present application provides an image sensor driving device 100, including a housing 1, an elastic support assembly 2, an image sensor assembly 3, a driving coil 4, and a magnet 5.

The housing 1 is provided with an accommodating space and a through-hole 13 connecting the accommodating space to the outside world. The image sensor assembly 3 is accommodated within the accommodating space and directly opposite the through-hole 13. The elastic support assembly 2 is fixed to the inner side of the housing 1 and suspending the image sensor assembly 3 within the accommodating space. The driving coil 4 is fixed to the image sensor assembly 3. The magnet 5 is fixed to the housing 1 and spaced opposite the driving coil 4. The driving coil 4 interacts with the magnet 5 and drives the elastic support assembly 2 in a direction perpendicular to an optical axis of the image sensor assembly 3 to drive the image sensor assembly 3 in synchronization.

The image sensor assembly includes a first circuit plate 31, a second circuit plate 32 provided around the periphery of the first circuit plate 31 and fixed and electrically connected to the first circuit plate 31, and an image sensor body 33 fixed to the first circuit plate 31. The second circuit plate 32 is directly opposite and spaced apart from the magnet 5.

The driving coil 4 is formed on the second circuit board 32 by material addition or etching, and is electrically connected to the second circuit board 32. The driving coil 4 includes a plurality of sub-coils 41, each of which includes a plurality of coil layers 411 stacked together. Wires of the plurality of the coil layers 411 are connected in series with each other to form a terminal 42 electrically connected to the wires of all the coil layers 411, and the terminal 42 is electrically connected to the second circuit board 32. Each coil layer 411 includes a copper wire layer 4111 and an insulating layer 4112. Specifically, the magnet 5 interacts with the driving coil 4 to drive the image sensor module 3 in a first direction and a second direction that are perpendicular to each other. The first direction, the second direction, and the optical axis direction are both perpendicular. It is to be understood that the image sensor driving device 100, in practice, is provided with a lens module at the top along its optical-axis direction, so that when the image sensor module 3 moves in a plane perpendicular to the optical-axis direction, it moves relative to the lens module, thereby realizing optical stabilization.

In this embodiment, the copper wires of the plurality of the copper wire layers 4111 are stacked together, and separated from each other by an insulating layer 4112. It should be noted that the number of layers of the coil layer 411 may be adjusted according to the requirements of the actual situation. In this embodiment, the second circuit board 32 includes a plurality of sub-circuit boards 321 spaced apart from each other. Each of the sub-circuit boards 321 is fixed and electrically connected to the first circuit board 31, and each of the sub-circuit boards 321 is provided with the driving coil 4.

In this embodiment, the image sensor assembly 3 further includes a soldering tab 34. Two adjacent sub-circuit boards 321 form a group of circuit boards, and two of the sub-circuit boards 321 in the same group of the circuit boards are provided with one of the soldering tabs 34 at an end close to each other, and are both electrically connected to the soldering tabs 34 for wiring.

Specifically, a plurality of coil layers 411 of the sub-coil 41 are connected in series with each other to form a plurality of terminals 42, and the terminals 42 are all led to the soldering tab 34 through the internal wires of the multi-layer structure of the sub-coil 41 to be welded with the first circuit board 31. After the wires of the plurality of coil layers 411 are connected in series to form the terminals 42, the lead wires are introduced to the soldering tab 34 to be welded in a uniform manner. The contact surfaces of the soldering tab 34 and the wires are material-consistent, effectively reducing the number of welds. It is to be noted that each coil layer 411 of each sub-coil 41 may also be provided separately.

In this embodiment, the first circuit board 31 is rectangular, and the sub-circuit boards 321 include four and are located at four corners of the first circuit board 31. Each of the sub-circuit boards 321 includes a first section 3211, a second section 3212 extending from where the first section 3211 bends, and a third section 3213 formed by a protrusion of a connection portion between the first section 3211 with the second section 3212. The first section 3211 and the second section 3212 are parallel to adjacent sides of the first circuit board 31. Both the first section 3211 and the second section 3212 are formed with the sub-coils 41, and the third section 3213 is fixed to the first circuit board 31.

In this embodiment, the image sensor driving device 100 further includes a conductive member 6. One end of the conductive member 6 is electrically connected to the first circuit board 31, and the other end of the conductive member 6 is used for connecting an external device.

In this embodiment, the image sensor driving device 100 further includes two anti-collision blocks 7 provided opposite to each other, and two groups of the circuit boards are each provided with one of the anti-collision blocks 7 at one end close to each other, and are both fixedly connected to the anti-collision block. 7.

In this embodiment, the housing 1 includes a bottom cover 12 and a top cover 11 fixed to the bottom cover 12 and enclosing the accommodating space together with the bottom cover. The through-hole 13 is opened in the top cover 11. The magnet 5 includes a first magnet 51 fixed to the top cover 11 and a second magnet 52 fixed to the bottom cover 12. The driving coil 4 is sandwiched between the first magnet 51 and the second magnet 52, and is spaced apart from both the first magnet 51 and the second magnet 52. The elastic member 33 is fixed to the bottom cover 12, and the anti-collision block 7 is fixedly connected to the top cover 11.

Compared to the related art, in the image sensor driving device proposed in the present application, the driving coil is fixed to the elastic support assembly by material additions or etching, thereby eliminating the need for a separate wire straightening and placing process, effectively simplifying the assembly process and cost, and saving the stacking space along the optical axis direction of the image sensor, which is conducive to the design of the magnetic circuit to enhance the BL value. Due to the design of the additive material or etching fixed in the elastic support assembly, the weight of the driving coil is effectively reduced, and the moving mass is about 10% lower than that of the voice coil.

Described above are only embodiments of the present application, and it should be pointed out that, for the ordinary technical personnel in the field, improvements may also be made without departing from the premise of the concept of the present application, but these are all within the protection scope of the present application.

What is claimed is:

1. An image sensor drive device, comprising:

a housing provided with an accommodating space and a through-hole connecting the accommodating space to the outside world;

an image sensor assembly accommodated within the accommodating space and directly opposite the through-hole;

an elastic support assembly fixed to an inner side of the housing and suspending the image sensor assembly within the accommodating space;

a driving coil fixed to the image sensor assembly; and a magnet fixed to the housing and spaced opposite the driving coil; wherein the driving coil interacts with the magnet and drives the elastic support assembly in a direction perpendicular to an optical axis of the image sensor assembly to drive the image sensor assembly in synchronization;

the image sensor assembly comprises a first circuit plate, a second circuit plate provided around a periphery of the first circuit plate and fixed and electrically connected to the first circuit plate, and an image sensor body fixed to the first circuit plate;

the second circuit board is directly opposite and spaced apart from the magnet; the driving coil is formed on the second circuit board by material additions or etching, and is electrically connected to the second circuit board; the driving coil comprises a plurality of sub-coils, and each of the sub-coils comprises a plurality of coil layers stacked together; wires of the plurality of the coil layers are connected in series with each other to form a terminal electrically connected to the wires of all the coil layers, and the terminal is electrically connected to the second circuit board.

2. The image sensor driving device of claim 1, wherein each of the coil layers comprises a copper wire layer and an insulating layer.

3. The image sensor driving device of claim 1, wherein the second circuit board comprises a plurality of sub-circuit boards spaced apart from each other, and each of the sub-circuit boards is fixed and electrically connected to the first circuit board, and each of the sub-circuit boards is formed with the sub-coil.

4. The image sensor driving device of claim 3, wherein the first circuit board is rectangular, and the sub-circuit boards comprise four and are located at four corners of the first circuit board, respectively; each of the sub-circuit boards comprises a first section, a second section extending from where the first section bends, and a third section formed by protrusion of a connection portion between the first section and the second section; the first section and the second section are parallel to adjacent sides of the first circuit board, respectively; both the first section and the second section are formed with the sub-coil, and the third section is fixed to the first circuit board.

5. The image sensor driving device of claim 4, further comprising a soldering tab, wherein two adjacent sub-circuit boards form a group of circuit boards, and two of the sub-circuit boards in the same group of the circuit boards are provided with one of the soldering tabs at an end close to each other, and are both electrically connected to the soldering tabs for wiring.

6. The image sensor driving device of claim 5, further comprising two anti-collision blocks provided opposite to each other, and two group of the circuit boards are each provided with one of the anti-collision blocks at one end close to each other, and are both fixedly connected to the anti-collision block.

7. The image sensor driving device of claim 6, wherein the housing comprises a bottom cover and an upper cover fixed to the bottom cover and enclosing the accommodating space together with the bottom cover; the through-hole is opened in the upper cover; the magnets comprises a first magnet fixed to the upper cover and a second magnet fixed to the bottom cover; the driving coil is sandwiched between the first magnet and the second magnet, and is spaced apart from the first magnet and the second magnet; the elastic member is fixed to the bottom cover, and the anti-collision block is fixedly connected to the top cover.

8. The image sensor driving device of claim 1, further comprising a conductive member, wherein one end of the conductive member is electrically connected to the first circuit board, and the other end of the conductive member is used for connecting an external device.

* * * * *